United States Patent [19]
Funabashi et al.

[11] Patent Number: 5,370,928
[45] Date of Patent: Dec. 6, 1994

[54] MAGNETIC RECORDING MEDIUM

[75] Inventors: Makoto Funabashi; Naoto Abe; Koji Sasazawa, all of Kanagawa, Japan

[73] Assignee: Fuji Photo Film Co., Ltd., Kanagawa, Japan

[21] Appl. No.: 826,418

[22] Filed: Jan. 27, 1992

[30] Foreign Application Priority Data

Feb. 15, 1991 [JP] Japan .................... 3-42356

[51] Int. Cl.⁵ .................... B32B 5/16; G11B 5/66
[52] U.S. Cl. .................... 428/336; 428/611; 428/678; 428/694 T; 428/694 TS; 428/694 TM; 428/900
[58] Field of Search ............ 428/694, 900, 611, 678, 428/702, 928, 694 T, 694 TS, 694 TM, 336; 427/131; 204/192.1

[56] References Cited

U.S. PATENT DOCUMENTS

| | | | |
|---|---|---|---|
| 4,622,271 | 11/1986 | Arai et al. | 428/615 |
| 4,743,491 | 5/1988 | Asada et al. | 428/213 |
| 4,754,005 | 5/1988 | Sugita et al. | 427/128 |
| 4,775,576 | 10/1988 | Bouchand et al. | 428/216 |
| 4,883,711 | 11/1989 | Shiroishi et al. | 428/336 |

Primary Examiner—Paul J. Thibodeau
Assistant Examiner—L. Kiliman
Attorney, Agent, or Firm—Sughrue, Mion, Zinn, Macpeak & Seas

[57] ABSTRACT

A magnetic recording medium providing a high reproducing output and a high C/N over a wide recording frequency region is disclosed. The magnetic recording medium comprises a non-magnetic substrate and a lower magnetic layer, a non-magnetic intermediate layer and an upper magnetic layer on the substrate in this order so that the ratio of the non-magnetic intermediate layer thickness (t) to the upper magnetic layer thickness (d), i.e., (t/d), is within the range of 0.1/1 to 0.3/1.

10 Claims, 1 Drawing Sheet

MAGNETIC RECORDING MEDIUM

FIELD OF THE INVENTION

The present invention relates to an improved magnetic recording medium of the so-called ferromagnetic metal thin film type in which a ferromagnetic metal thin film is provided as a magnetic layer on a non-magnetic support by a vacuum vapor deposition method. Specifically, it is concerned with a magnetic recording medium of the ferromagnetic metal thin film type, which is suitable for use in broad-band signal recording in Hi-vision applications, for example, and in high density recording.

BACKGROUND OF THE INVENTION

High density recording has been in strong demand as a magnetic recording medium. In order to achieve high density recording, it is necessary to increase reproducing output, to decrease noise, or to increase C/N (ratio of carrier (C) to noise (N)) by both increased reproducing output and decreased noise.

In a coating type of magnetic recording medium which has conventionally been widely used, magnetic recording-reproducing characteristics of high density and high C/N are attained by changing the magnetic material to be used, for example, from iron oxide powder to metal powder, and also by improving the magnetic characteristics of the material or by decreasing the size of magnetic particles. However, a coating type magnetic recording medium is limited in terms of further improvement in high density recording and, therefore, as a new material for attaining high density recording, a metal thin film type of medium is now being developed.

Various methods are known for the formation of a metal magnetic thin film, including a vacuum film forming method in which a ferromagnetic metal is provided in a vacuum in the form of a thin film on a substrate, such as a polymer film, by a method, such as sputtering, ion plating or electron beam vapor deposition, or a plating method in which a thin film is formed on a substrate in an aqueous solution. Some magnetic tape media produced by the electron beam vapor deposition method are now put into practical use as magnetic tapes for a 8 mm video system, i.e., so-called Hi-8ME.

In recent years, an increase in recording density has been in strong demand, and the demand for high volume recording has also increased. In order to comply with this demand, an improvement in the characteristics of the metal magnetic thin film type of magnetic recording medium is now under investigation.

In order to improve these characteristics of the metal thin film type of recording medium, such as that produced by the electron beam vapor deposition method using Co—Ni, the following have been made:

(1) Improvement of the structure of particles in the magnetic film, through the increase of coercive force and reduction of noise by introducing oxygen at the time of vacuum vapor deposition.

(2) Reduction of noise by employing a multi-layer structure in a plurality of vapor deposited films, and improvement of recording-reproducing characteristics by improving magnetic characteristics of the magnetic film (including the provision of a non-magnetic intermediate layer).

(3) Removal of direction dependency of recording-reproducing characteristics by controlling the direction of growth of magnetic particles in an oblique vapor deposited film of multi-layer structure.

(4) Increase of durability by providing a non-magnetic intermediate layer between magnetic films in a multi-layer structure of oblique vapor-deposited films.

In accordance with the above methods, however, it has been impossible to increase the reproducing output and C/N over a broad recording signal band. In other words, with the metal thin film type of magnetic medium, a high reproducing output can be obtained in a region of shorter recording wave length, but in a region of longer recording wave length, the reproducing output is decreased compared to the coating type of recording medium.

In order to increase the output in the shorter recording wavelength region to attain high density recording, decreasing the thickness of the magnetic layer and increasing the coercive force and so forth are effective techniques. However, when these techniques are employed, the reproducing output in the longer recording wavelength region decreases to a greater extent. On the other hand, if the thickness of the magnetic layer is increased, the output in the shorter recording wavelength region is decreased. This has not been possible to attain along with high density recording.

In recent years, however, a medium for high density recording of high vision signals or digital signals of high transfer rate has been in increasing demand. For high quality and high density recording of the above signals, there is a need for a recording medium which permits one to obtain a high reproducing output over a broad frequency region, i.e., a broad recording wavelength region. However, no magnetic recording medium complying with these requirements has been obtained so far.

SUMMARY OF THE INVENTION

An object of the present invention is to provide a ferromagnetic metal thin film type of magnetic recording medium which permits one to obtain a high reproducing output and a high C/N over a broad recording frequency region, i.e., from a longer wavelength side to a shorter wavelength side.

The present invention relates to a magnetic recording medium comprising a non-magnetic substrate and a magnetic layer comprising a ferromagnetic metal thin film on the substrate, wherein the ferromagnetic metal thin film is formed by laminating a lower magnetic layer, a non-magnetic intermediate layer having a thickness of t, and an upper magnetic layer having a thickness of d in this order on the non-magnetic substrate so that the t/d is within the range of 0.1/1 to 0.3/1.

It has been found according to the present invention that the above object is attained by optimizing the relation among magnetic characteristics of the upper magnetic layer, the thickness of the non-magnetic intermediate layer and magnetic characteristics of the lower magnetic layer. Based on the findings, the present invention has been completed.

1—Non-magnetic substrate
2—Lower magnetic layer
3—Upper magnetic layer
4—Non-magnetic intermediate layer
11—Vacuum chamber
12—Vapor source
13—Feeding roll
14—Cylindrical can
15—Winding reel
16—Shielding plate
17—Heating means
18—Non-magnetic substrate

DETAILED DESCRIPTION OF THE INVENTION

Controlling the t/d (non-magnetic intermediate layer thickness/upper magnetic layer thickness) within the range of 0.1/1 to 0.3/1 according to the present invention permits one to increase the reproducing output level in a region in which the wavelength of frequency signal is intermediate (intermediate wavelength region $\lambda=0.5$ to 2 $\mu$m) while maintaining a high reproducing output level in a region in which the wavelength of frequency signal for recording is long (long wavelength region $\lambda=2$ to 10 $\mu$m) as well as in a region in which the wavelength of frequency signal is short (short wavelength region $\lambda=0.1$ to 0.5 $\mu$m).

By controlling the lower limit of t/d to 0.1 or more, the output level in the long wavelength region is maintained at a high level and at the same time, a decrease of the output level in the short wavelength and intermediate wavelength regions is prevented. By controlling the upper limit of t/d to 0.3 or less, a high output level in the short wavelength region is maintained and at the same time, a decrease of the output level in the intermediate wavelength and long wavelength regions is prevented, whereby the reproducing output level in the intermediate wavelength region can be increased.

Although the exact reason why the above characteristics are obtained by controlling the t/d within the above range is not clear, it is believed that they are obtained by the magnetic mutual action of the upper and lower magnetic layers. It is considered that when the t/d is large, the thickness of the non-magnetic intermediate layer can be made sufficiently large and the thickness of the upper magnetic layer can be made small, whereby the output at the shorter wavelength side is excellent. When the t/d is small, if the thickness of the intermediate layer is made small, the thickness of the upper magnetic layer is relatively increased and its behavior becomes like that of the thick magnetic film, so that the output at the longer wavelength side is increased, but the output at the shorter wavelength side is decreased under influences of demagnetization field. Thus, it is considered that the optimum thickness of the non-magnetic intermediate layer and of the upper magnetic layer is specified by limiting the t/d to the above range, and the output is increased over the total wavelength region including the intermediate region.

Figure 1:
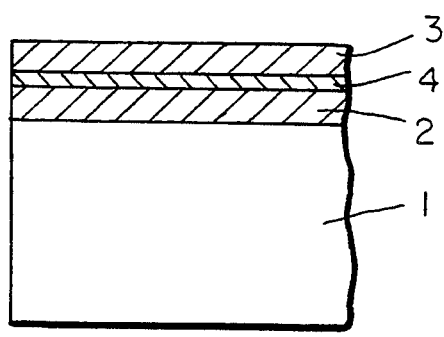
FIG. 1 shows a schematic cross-sectional view of an example of the magnetic recording medium of the present invention.

The magnetic recording medium of the present invention, as illustrated in FIG. 1, comprises the non-magnetic substrate 1 and the lower magnetic layer 2, the non-magnetic intermediate layer 4 and the upper magnetic layer 3 provided on the substrate 1 in this order in such a manner that the non-magnetic intermediate layer 4 is sandwiched between the ferromagnetic metal thin films of the upper and lower magnetic layers 2 and 3. Although, the lower magnetic layer 2 is made of only a ferromagnetic metal thin film, it may be in the structure that at least one non-magnetic layer is interposed among ferromagnetic metal thin films. The structure and composition of the non-magnetic layer are not critical and may be the same as or different from those of the non-magnetic intermediate layer 4.

The upper magnetic layer 3 may be in a multi-layer structure in which the layers may be made of the same composition but have different crystal structures, or may have the same crystal structure and be oriented in different ways, and/or may be made of different compositions irrespective of the crystal structure. Likewise, the lower magnetic layer 2 may have the same multi-layer structure as in the upper magnetic layer 3.

In the present invention, the means to form the ferromagnetic metal thin film comprising the upper and lower magnetic layers is not critical.

For the formation of the ferromagnetic metal thin film, means such as electric plating, non-electrolytic plating, gas phase plating, sputtering, vapor deposition and ion plating can be employed.

Hexagonal crystal, rhombic prismatic crystal, vertical prismatic crystal and so forth are examples of the crystal structure of the ferromagnetic metal thin film.

In order to more effectively attain the objects of the present invention, it is preferred to employ the oblique vapor deposition method for the formation of the ferromagnetic metal thin film, and a ferromagnetic metal thin film of rhombic prismatic crystals as formed by the above method is preferred.

The structural feature of the rhombic prismatic crystals is, for example, such that crystals are arranged in an obliquely folded form.

The obliquely vapor deposited film is formed by depositing vaporized metal atoms from an evaporation source onto a moving substrate while continuously changing from a high incident angle to a low incident angle, for example, from 90° to 40° or from 50° to 10°, and it exhibits a bent, prismatic particle form. It is also possible that by introducing an oxidizing gas containing oxygen, or a mixture of an oxidizing gas and an inert gas into a vacuum chamber during oblique vapor deposition, a film in a prismatic particle form containing an oxide is formed. The film obtained by introducing the oxidizing gas has particularly excellent magnetic characteristics and excellent reproducing output and noise, and when used in a magnetic tape form, has increased durability.

The formation method of the non-magnetic intermediate layer is not critical and can be achieved by any desired method. For example, the non-magnetic intermediate layer can be formed by a technique, such as coating of a non-magnetic material, or vapor deposition.

As for the coating method, there is a method in which a coating composition prepared by dispersing inorganic particles of e.g., metal, metal oxide or metal nitride in a solution of resin binder as required is coated to form the film. In this case, a lubricating agent and so forth may be incorporated into the non-magnetic intermediate layer.

In the case of the vapor deposition method, a vacuum vapor deposition apparatus for formation of a ferromagnetic metal thin film can be employed. The desired film can be formed by using a non-magnetic metal material, such as Cu, Pt, Ti, Al, Cr or Bi, as the metal material to be evaporated, or evaporating the metal material while introducing an oxygen-containing gas. In the practice of the present invention, since only the intermediate layer need be substantially non-magnetic, when a magnetic metal material is used, the non-magnetic oxide film can be formed by conducting the vapor deposition while introducing an oxygen-containing gas. Preferred metallic elements include Cu, Ti, Au and Al, and preferred metal oxides include oxides of Co, Ni, Si and Ti.

In the present invention, since the thickness of the non-magnetic intermediate layer can be easily controlled, the non-magnetic intermediate layer preferably has a structure of non-magnetic film formed from metal or a metal oxide.

Figure 2:
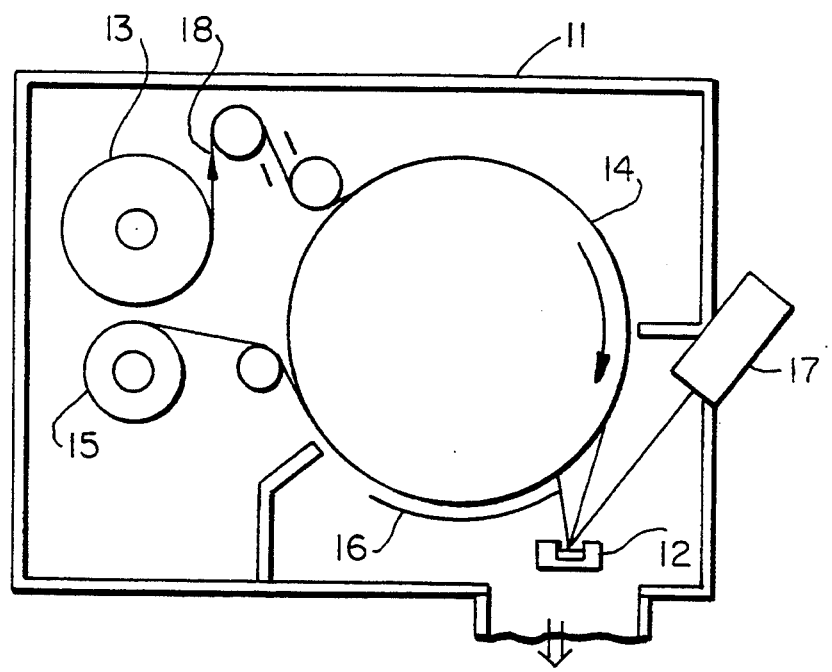
FIG. 2 shows a view illustrating an embodiment of a vacuum vapor deposition apparatus for use in the production of the magnetic recording medium of the present invention.

The major part of a vacuum vapor deposition apparatus which can be used in the present invention is shown in FIG. 2. This apparatus is set at the predetermined degree of vacuum, for example, not more than $1 \times 10^{-4}$ Torr by the use of a vacuum pump (not shown). When the upper magnetic layer and/or the lower magnetic layer are formed by introducing oxygen gas, the pressure is set to not more than $1 \times 10^{-3}$ Torr. When the non-magnetic intermediate layer is made of a metal oxide, the pressure is controlled to at least $1 \times 10^{-3}$ Torr. Inside of vacuum chamber 11, an evaporation source 12 which is heated by means such as heating by application of electron beam, a feeding roll (13), a cylindrical can (14) for cooling, a winding roll (15), a shielding plate (16) for controlling the incident angle of vaporized atoms, and so forth are placed. A non-magnetic substrate (18) supplied from the feeding roll (13) is continuously run along the can (14) while at the same time, vaporized atoms from the evaporation source (12) are deposited on the substrate (18) to form a continuous film of the vaporized atoms as an upper magnetic layer, or a lower magnetic layer, or a non-magnetic intermediate layer.

Thus, when the recording magnetic medium of the present invention is produced by employing only the above vacuum vapor deposition method, a magnetic recording medium of the structure shown in FIG. 1 can be obtained by repeating three times the above vapor deposition by the use of the same apparatus. In this case, the type of the metal as the evaporation source 12 may or may not be changed.

In the present invention, when the t/d can be specified within the range of 0.1/1 to 0.3/1, it is not necessary to specify the thickness of the upper magnetic layer. In order to obtain a magnetic thin film having the above characteristics, it is necessary for practical use that the thickness is at least 300 Å; it is substantially difficult to achieve appropriate magnetic characteristics using a thin film having a thickness of less than 300 Å. On the other hand, if the thickness of the upper layer is 1,200 Å or more, the output in the shorter wavelength region is decreased, and the object of the present invention cannot be attained. Accordingly, in the practice of the present invention, the thickness, d, of the upper layer is preferably 300 to 1,200 Å, with the range of 600 to 1,000 Å being particularly preferred.

Accordingly, the thickness, t, of the non-magnetic intermediate layer is preferably from 30 to 360 Å, with the range of 60 to 250 Å being particularly preferred.

Although the thickness of the lower magnetic layer is not critical, in the case of a tape-shaped magnetic recording medium, the preferred thickness is not more than 2,000 Å. The lower limit of the thickness of the lower magnetic layer is preferably 50 Å, more preferably 500 Å.

In connection with magnetic characteristics, it is desirable that the coercive force of the lower magnetic layer is at least 1,000 Oe and the coercive force of the upper magnetic layer is at least 250 Oe higher than that of the lower magnetic layer. Accordingly, the coercive force of the upper magnetic layer is preferably at least 1,250 Oe.

Metals such as Fe, Co and Ni, or their alloys, or alloys of the above metals and metals such as Cu, Pt and Cr are particularly preferred for use as the material for the ferromagnetic metal thin film.

A base of polyethylene terephthalate (PET), polyethylene naphthalate (PEN), polyaramide, polyimide, polyamide or the like can be used as the non-magnetic substrate for use in the present invention. In the application of magnetic tape, a base having a thickness of from several microns to ten and several microns is mainly used. The material and thickness of the non-magnetic substrate should be determined appropriately depending on the magnetic recording medium system. On the surface of the base, at least one type of projection, such as mountain-like projections, wrinkle-like projections, or granular projections, may be provided. By forming fine projections on the surface of the upper magnetic layer, the durability of the magnetic recording medium can be increased. Mountain-like projections or granular projections can be obtained by adding organic or inorganic particles at the time of forming a polymer film, or by coating organic or inorganic particles on the surface of the film. The wrinkle-like projections can be formed by for example, coating a dilute solution of a resin on a non-magnetic substrate, followed by drying, and then stretching the non-magnetic substrate. The height, distribution, density and so forth of the projections can be determined appropriately. It is preferred, however, that the height of the projection is 30 to 200 Å and the density is $1 \times 10^4$ to $3 \times 10^7 /mm^2$.

A protective film, and/or a lubricating agent film, can be provided on the outermost surface of the upper magnetic layer of the present invention for the purpose of increasing anti-corrosion properties and durability, of the magnetic film. Examples of the protective film are a thin film of oxide, a thin film of nitride, and a thin film of carbon. Various fatty acids, or their esters, perfluoropolyether and the like can be used as the lubricating agent. The lubricating agent is coated in the range usually of 2 to 30 mg/m$^2$, preferably 3 to 20 mg/m$^2$, as such or after being diluted with an organic solvent.

Although the surface form of the upper magnetic layer is not critical, when it has projections ranging from 1 to 50 nm in height, it has particularly excellent running properties and durability.

For the purpose of increasing adhesion of the ferromagnetic metal thin film or improving magnetic characteristics thereof, a subbing layer may be provided on the non-magnetic substrate independently from the non-magnetic layer.

The subbing layer can be made of known resin and/or inorganic particles, or the non-magnetic metal thin film, or the thin film of non-magnetic material.

The shape of the magnetic recording medium of the present invention may be of any a tape, sheet, card, disc and like form; preferably it is in the form of tape or disc.

In order to further increase the running durability of the magnetic recording medium of the present invention, a back layer comprising non-magnetic particles and a binder resin can be provided on the side opposite to that of the magnetic layer.

The present invention can provide a magnetic recording medium with which a high reproducing output and a high C/N can be obtained over a wide recording frequency region of from longer wavelength to shorter wavelength only by controlling the thickness of the non-magnetic intermediate layer and the upper magnetic layer within the specified range. Thus the present invention can provide video tapes for high vision and so forth at low production costs.

The present invention is described in greater detail with reference to the following example, although the present invention is not intended to be limited thereto. Unless otherwise indicated herein, all parts, percents, ratios and the like are by weight.

EXAMPLE

In this example, the apparatus shown in FIG. 2 was used. As the non-magnetic substrate, there was used a 10 μm thick polyethylene terephthalate film with fine projections of height of about 200 Å and density of $1.2 \times 10^7$/mm provided on the surface thereof, on which a ferromagnetic metal thin film was to be deposited. First, in order to form a lower magnetic layer, an alloy having the composition of 80% Co and 20% Ni was used as the evaporation source; the alloy was vaporized by application of electron beam heating and deposited on the substrate while conveying the substrate. During this process, oxygen gas was introduced into the vacuum chamber and the amount of the oxygen gas introduced was controlled so that the saturated magnetization (Bm) of the magnetic layer was about 4,500 gausses, and at the same time, the position of the shielding plate was adjusted so that the coercive force was about 1,000 Oe.

In order to form a non-magnetic intermediate layer, while conveying the substrate on which the lower magnetic layer had been provided, Cu as the evaporation source was heated by application of electron beam, and the non-magnetic intermediate layer having a desired thickness within the range of 50 to 400 Å was formed.

In addition, in order to form an upper magnetic layer, while conveying the substrate on which the Cu intermediate layer had been provided, a magnetic film as the upper magnetic layer was formed in the same manner as in the formation of the lower magnetic layer. By changing the position of the shielding plate and the amount of oxygen introduced, the thickness and magnetic characteristics of the upper magnetic layer were adjusted.

According to the above procedure, three layer-structure magnetic tape samples No. 1 to No. 12 were produced, in which the magnetic characteristics and thickness of the lower magnetic layer were changed, the thickness of the Cu intermediate layer was changed, and the magnetic characteristics and thickness of the upper magnetic layer were changed. Samples No. 1, No. 7, No. 8 and No. 11 are comparative examples, and the others are examples of the present invention. For comparison, sample No. 13, in which only the upper and lower layers were provided without the intermediate layer, and sample No. 14, in which only a single layer film was provided, were prepared. The structures of all the samples are shown in Table 1. In these samples, the surface of the magnetic layer was coated with a lubricating agent, and a back layer was provided on the substrate at the opposite side of the magnetic layer. Then, they were slit in the predetermined width so as to comply with the specifications for 8 mm video, and placed in a cassette.

In measurement of electromagnetic conversion characteristics, an 8 mm video deck was used. With single wavelength signals of frequencies of 2 MHz, 5 MHz and 8 MHz as the maximum output level, recording was conducted at the optimum recording current for the respective frequencies, and the reproducing level at this time was measured by the use of a spectrum analyzer. The results are shown in Table 2. In Table 2, the output level of sample No. 14 was employed as the measuring base (10 dB) at the respective frequencies.

TABLE 1

| Sample No. | Lower Magnetic Layer | | | t (Å) | Upper Magnetic Layer | | | t/d | Difference in Hc between Upper and Lower Layers (Oe) |
|---|---|---|---|---|---|---|---|---|---|
| | Thickness (Å) | Hc (Oe) | Bm* | | d (Å) | Hc (Oe) | Bm* | | |
| 1 | 1000 | 980 | 4800 | 100 | 1200 | 1070 | 4700 | 0.08 | 90 |
| 2 | 1000 | 980 | 4800 | 200 | 1200 | 1070 | 4700 | 0.17 | 90 |
| 3 | 1000 | 980 | 4800 | 300 | 1200 | 1070 | 4700 | 0.25 | 90 |
| 4 | 1000 | 980 | 4800 | 200 | 950 | 1320 | 4600 | 0.21 | 340 |
| 5 | 1100 | 1050 | 4700 | 100 | 950 | 1320 | 4600 | 0.11 | 270 |
| 6 | 1100 | 1050 | 4700 | 200 | 950 | 1320 | 4600 | 0.21 | 270 |
| 7 | 1100 | 1050 | 4700 | 300 | 950 | 1320 | 4600 | 0.32 | 380 |
| 8 | 1000 | 1100 | 4900 | 50 | 750 | 1480 | 4600 | 0.07 | 380 |
| 9 | 1000 | 1100 | 4900 | 100 | 750 | 1480 | 4600 | 0.13 | 380 |
| 10 | 1000 | 1100 | 4900 | 200 | 750 | 1480 | 4600 | 0.27 | 380 |
| 11 | 1000 | 1100 | 4900 | 300 | 750 | 1480 | 4600 | 0.40 | 380 |
| 12 | 1000 | 1100 | 4900 | 200 | 950 | 1320 | 4500 | 0.21 | 220 |
| 13 | 1000 | 980 | 4800 | 0 | 950 | 1320 | 4600 | 0.0 | 340 |
| 14 | 1450 | 950 | 4700 | — | — | — | — | — | — |

*: gauss

TABLE 2

| Sample No. | Output (dB) | | |
|---|---|---|---|
| | 2 MHz | 5 MHz | 8 MHz |
| 1 | +2.5 | +0.3 | −0.5 |
| 2 | +2.0 | +1.2 | +1.0 |
| 3 | +1.7 | +0.3 | +1.0 |
| 4 | +1.5 | +1.0 | +2.5 |
| 5 | +1.9 | +2.0 | +2.5 |
| 6 | +2.0 | +2.2 | +3.1 |
| 7 | +1.0 | +0.3 | +2.8 |
| 8 | +1.5 | +0.5 | +1.0 |
| 9 | +1.1 | +2.4 | +4.0 |
| 10 | +1.0 | +3.0 | +4.5 |
| 11 | +0.5 | +0.8 | +4.0 |
| 12 | +1.8 | +0.6 | +2.9 |
| 13 | +2.0 | 0 | −0.5 |
| 14 | 0 | 0 | 0 |

From the results of Table 2, it can be seen that, at the optimum non-magnetic intermediate layer thickness (t), the reproducing output is excellent over all the recording wavelengths, from long wavelength (2 MHz) to intermediate wavelength (5 MHz) to short wavelength (8 MHz). The optimum thickness can be specified not by the thickness of the non-magnetic intermediate layer but rather by the ratio of thickness (t) to the upper magnetic layer thickness (d). As the ratio of the non-magnetic intermediate layer thickness (t) to the upper magnetic layer thickness (d) gets smaller, the reproducing output level in the longer wavelength region is increased, but the reproducing output level in the memory region of intermediate wavelength and the recording region of short wavelength tends to be increased to a lesser extent. This tendency is prominent when the t/d is not more than 0.1/1. On the other hand, as the t/d is greater, the reproducing output level in the recording region of short wavelength is more markedly increased, but the output in the intermediate wavelength and long wavelength regions is less increased and rather decreased respectively. This tendency is marked when the t/d is 0.3/1 or more. If, however, the t/d is specified within the range of 0.1/1 to 0.3/1, the output over the total recording wavelength region can be increased.

Moreover, when the coercive force of the lower magnetic layer is at least 1,000 Oe and the difference in coercive force between the upper and lower magnetic layers (Hc of the upper magnetic layer—Hc of the lower magnetic layer) is at least 250 Oe, particularly excellent characteristics are exhibited.

Although the reason why the above characteristics are obtained is not clear, it is believed that they are obtained by the magnetic mutual action of the upper and lower magnetic layers. When the thickness of the non-magnetic intermediate layer is sufficiently large, the magnetic recording medium behaves like a single film of the upper magnetic layer. It is believed that the excellent characteristics in the short wavelength output become more marked due to a decrease of the thickness of the magnetic layer. On the other hand, it is suspected that when the thickness of the non-magnetic intermediate layer is small, the magnetic recording medium behaves like a thick magnetic film, and although the output in the long wavelength region is increased, the output in the short wavelength region is decreased under influences of demagnetization. However, if the optimum t/d is specified within the range of 0.1/1 to 0.3/1, the output can be increased over the total wavelength region including the increase of the output in the intermediate wavelength region.

Although the above explanation has been made referring to the apparatus shown in FIG. 2, the magnetic recording medium of the present invention can be produced by forming three layers concurrently by the use of a vapor deposition apparatus including two or a three cans. In the above example, Cu was used as the material for the formation of the non-magnetic intermediate layer, but any film-forming materials can be used as long as they have characteristics that are nearly non-magnetic.

While the invention has been described in detail and with reference to specific embodiments thereof, it will be apparent to one skilled in the art that various changes and modifications can be made therein without departing from the spirit and scope thereof.

What is claimed is:

1. A ferromagnetic metal thin film recording medium, comprising a non-magnetic substrate, a lower magnetic layer, a non-magnetic intermediate layer having a thickness of t, and an upper magnetic layer having a thickness of d, the lower magnetic layer, the non-magnetic intermediate layer and the upper magnetic layer being arranged in this order on the non-magnetic substrate, wherein t/d is between 0.1 to 0.3, the lower magnetic layer has a coercive force of at least 1,000 Oe, the upper magnetic layer has a coercive force of at least 250 Oe higher than the coercive force of the lower magnetic layer, and the upper magnetic layer has a thickness of from 300 to 1,200 Å.

2. The magnetic recording medium as claimed in claim 1, wherein the ferromagnetic metal thin film is formed by oblique vapor deposition.

3. The magnetic recording medium as claimed in claim 1, wherein the non-magnetic intermediate layer is a metal or metal oxide layer.

4. The magnetic recording medium as claimed in claim 3, wherein the metal in the non-magnetic intermediate layer is Cu, Ti, Au, or Al.

5. The magnetic recording medium as claimed in claim 1, wherein the upper magnetic layer has a thickness of from 600 to 1,000 Å.

6. The magnetic recording medium as claimed in claim 1, wherein the intermediate non-magnetic layer has a thickness of from 30 to 360 Å.

7. The magnetic recording medium as claimed in claim 1, wherein the intermediate non-magnetic layer has a thickness of from 60 to 250 Å.

8. The magnetic recording medium as claimed in claim 1, wherein the lower magnetic layer has a thickness of from 50 to 2,000 Å.

9. The magnetic recording medium as claimed in claim 1, wherein the lower magnetic layer has a thickness of from 500 to 2,000 Å.

10. The magnetic recording medium as claimed in claim 3, wherein the metal oxide in the non-magnetic intermediate layer is an oxide of Co, Ni, Si or Ti.

* * * * *